July 19, 1966   R. G. FRANK   3,261,211
SERVOMECHANISM
Filed March 26, 1964   4 Sheets-Sheet 1

INVENTOR.
RAYMOND G. FRANK
BY Busser Smith & Harding
ATTORNEYS

July 19, 1966 R. G. FRANK 3,261,211
SERVOMECHANISM
Filed March 26, 1964 4 Sheets-Sheet 2

INVENTOR.
RAYMOND G. FRANK
BY
ATTORNEYS

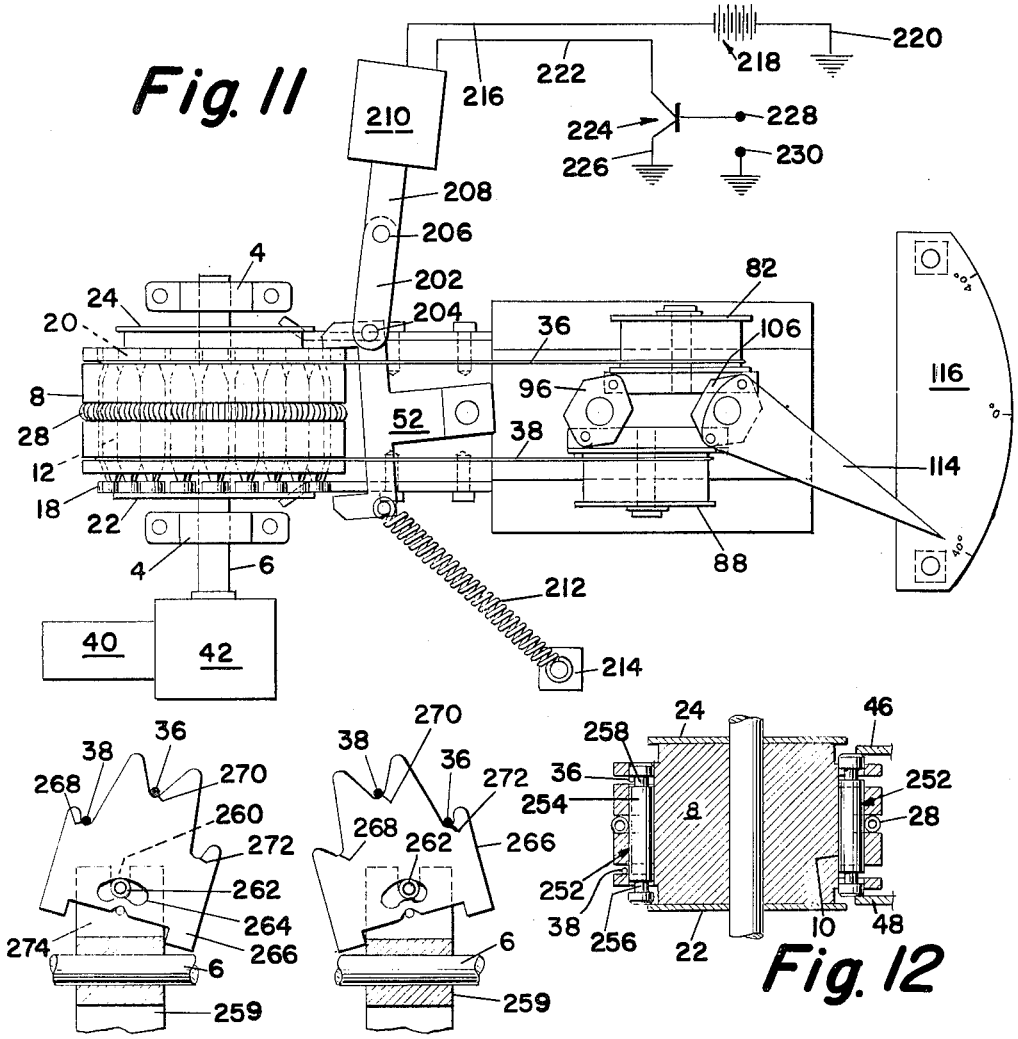
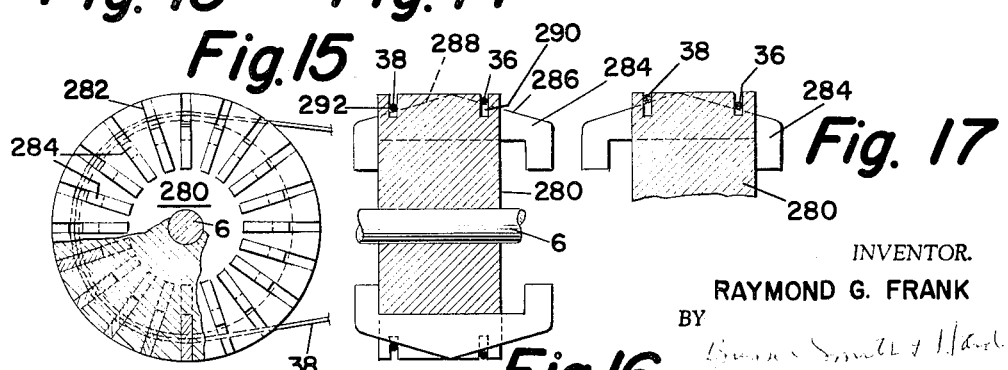

July 19, 1966  R. G. FRANK  3,261,211
SERVOMECHANISM
Filed March 26, 1964  4 Sheets-Sheet 4
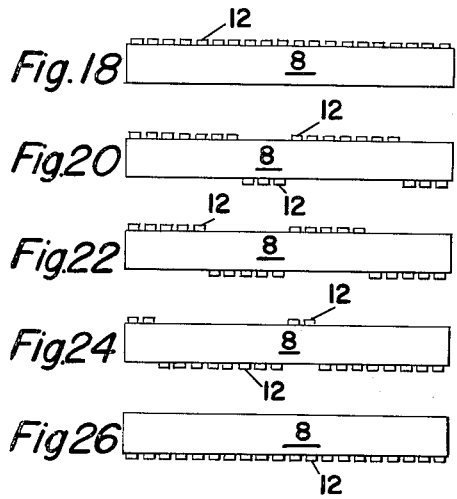
Fig.18
Fig.20
Fig.22
Fig.24
Fig.26
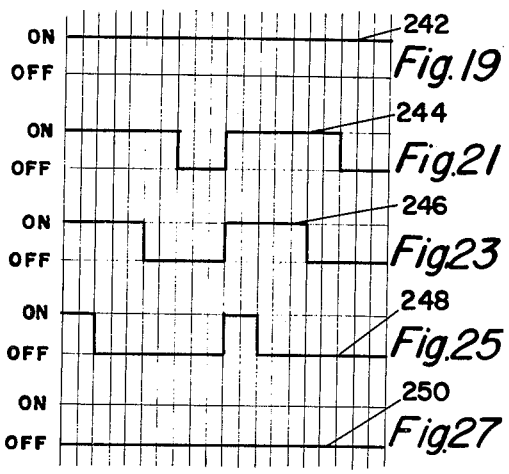
Fig.19
Fig.21
Fig.23
Fig.25
Fig.27
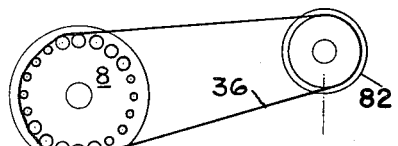
Fig. 28
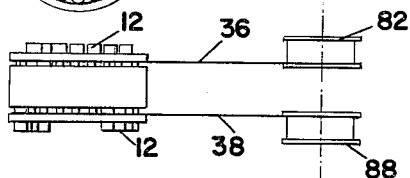
Fig. 29
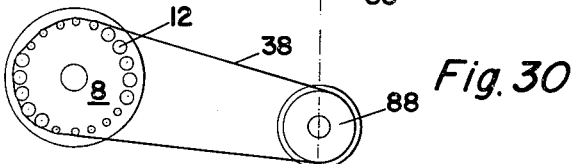
Fig. 30
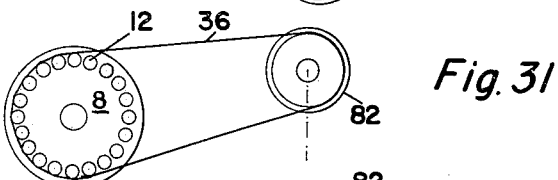
Fig. 31
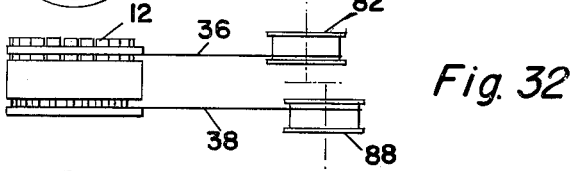
Fig. 32
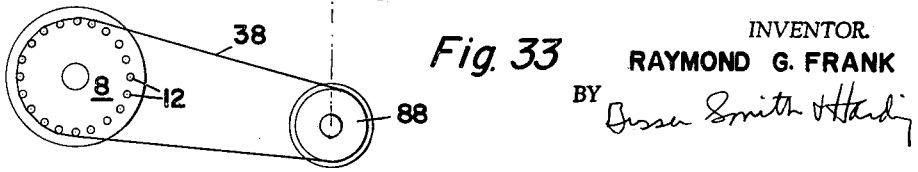
Fig. 33
INVENTOR.
RAYMOND G. FRANK
BY
ATTORNEYS United States Patent Office 3,261,211
Patented July 19, 1966

3,261,211
SERVOMECHANISM
Raymond G. Frank, Salisbury, Md., assignor to Ametek, Inc., New York, N.Y., a corporation of Delaware
Filed Mar. 26, 1964, Ser. No. 354,988
14 Claims. (Cl. 74—1)

This invention relates to a servomechanism in which a mechanical input serves to produce a highly amplified mechanical output.

The servomechanism of the invention is of particular value where the mechanical input is produced by electrical means responsive to electrical intelligence and is of unusual flexibility. Either an analog or digital input may be employed and the output can take a wide variety of forms of, for example, angular, linear or rotational output.

In accordance with the invention, a cable or the like continuously measures a mechanical path length controlled by a small force mechanical input. The mechanical output is responsive to the differences in path lengths.

The invention and its objects will be clarified on reading the following description in conjunction with the drawings in which:

FIGURE 11 is a plan view of a modified servo-mechanism in accordance with the invention;

FIGURE 12 is a horizontal section taken through the drum of the servomechanism of FIGURE 11 with modified pins substituted;

FIGURE 13 is a vertical section partly broken away through a modified drum for the servomechanism of the invention showing the path length in one condition;

FIGURE 14 shows the structure of FIGURE 13 with the path length in a second condition;

FIGURE 15 is a side elevation of an alternative drum embodiment;

FIGURE 16 is a vertical section through the drum of FIGURE 15 showing the path length in one condition;

FIGURE 17 shows the structure of FIGURE 16 partially broken away with the path length in a second condition;

FIGURE 18 is a schematic representation in development form of a drum path length condition;

FIGURE 19 is a representation of the electrical signal producing the path length condition shown in FIGURE 18;

FIGURE 20 is a schematic representation in development form of a drum path length condition;

FIGURE 21 is a representation of the electrical signal producing the path length condition of FIGURE 20;

FIGURE 22 is a schematic representation in development form of a drum path length condition;

FIGURE 23 is a representation of the electrical signal producing the path length condition of FIGURE 22;

FIGURE 24 is a schematic representation in development form of a drum path length condition;

FIGURE 25 is a representation of the electrical signal producing the path length condition of FIGURE 24;

FIGURE 26 is a schematic representation in development form of a drum path length condition;

FIGURE 27 is a representation of an electrical signal producing the path length condition of FIGURE 26;

FIGURES 28, 29 and 30 are a schematic rear elevation, plan view and front elevation respectively in an orthogonal relationship of a drum producing a path length in accordance with the representation of FIGURE 22; and FIGURES 31, 32 and 33 are a schematic rear elevation, plan view and front elevation respectively in an orthogonal relationship of the drum of FIGURES 28–30 illustrating unequal path lengths.

Figure 1:
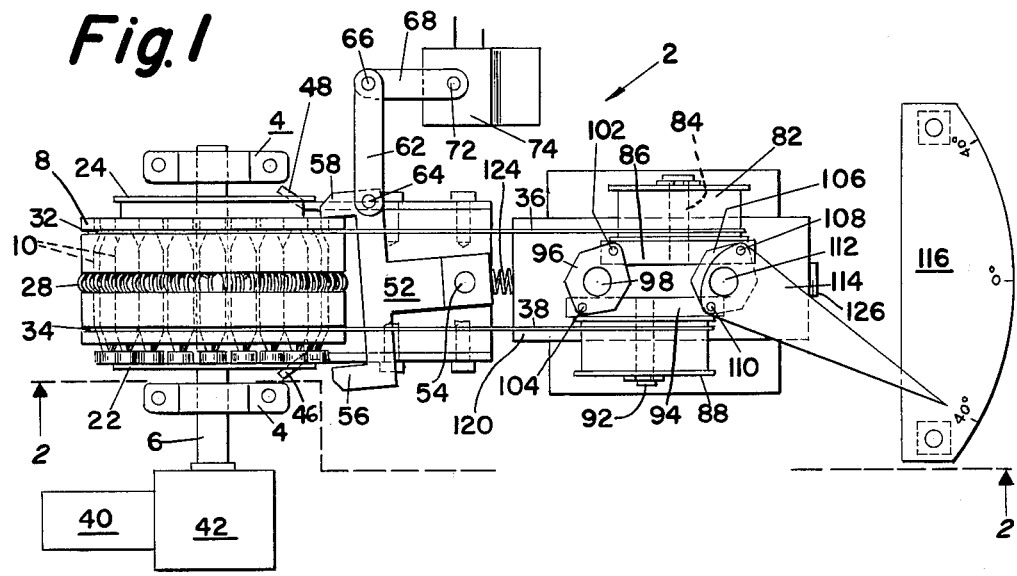
FIGURE 1 is a plan view of an embodiment of a servomechanism in accordance with the invention.
Figure 2:
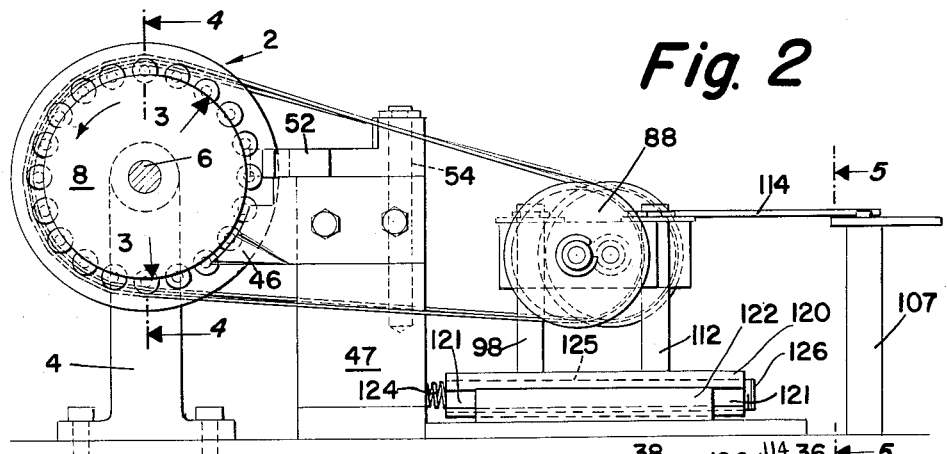
FIGURE 2 is a vertical section of the servo mechanism of FIGURE 1 taken on the planes indicated by the line 2—2 in FIGURE 1.
Figures 3, 4, 5:
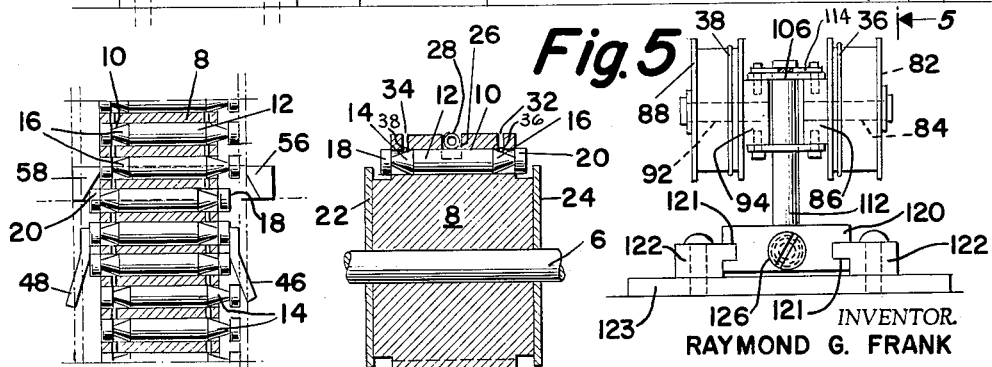
FIGURE 3 is a section taken on the arc indicated by the arc 3—3 of FIGURE 2.
FIGURE 4 is a vertical section taken on the plane indicated by the line 4—4 in FIGURE 2.
FIGURE 5 is a vertical section taken on the plane indicated by the line 5—5 in FIGURE 2.
Figure 6:
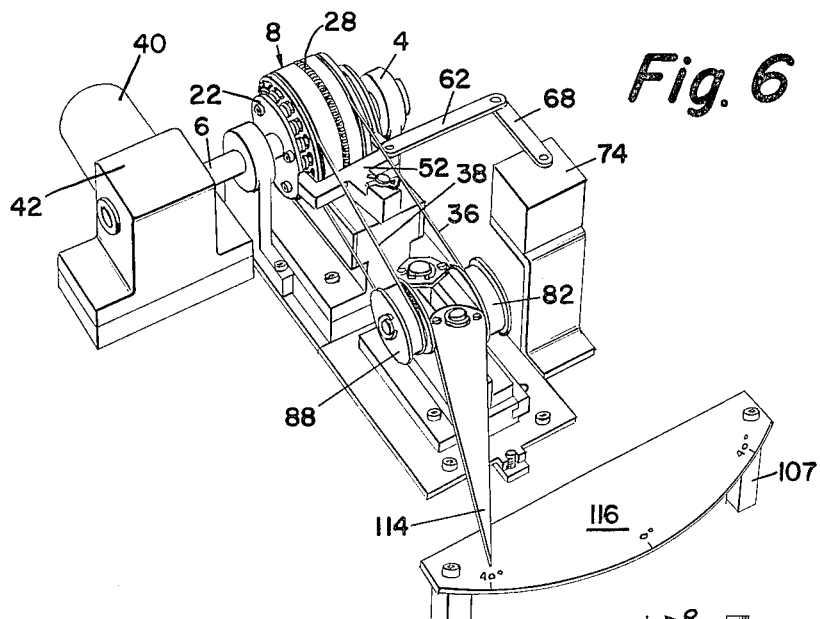
FIGURE 6 is a top perspective view of the servo device of FIGURE 1.

Referring now variously to FIGURES 1 through 6, a servomechanism 2 has a pair of supports 4, 4 to which a shaft 6 is journalled. A drum 8 is fixedly secured to rotate with shaft 6. As best seen in FIGURE 4, drum 8 has a plurality of transverse bores 10 adjacent its outer periphery, each opening accommodating a pin 12 having a tapered shoulder 14 and a tapered shoulder 16 and enlarged ends 18 and 20 which are adapted to abut against side plates 22 and 24 respectively, which are secured to drum 8. A peripheral groove 26 in drum 8 accommodates a garter spring 28 which engages pins 12 to hold them in the positions in which they are set. Peripheral grooves 32 and 34 respectively accommodate endless cables 36 and 38 (FIGURE 1) which in their paths around drum 8 engage pins 12. Drum 8 is continuously rotated at a constant speed by means of a constant speed electric motor indicated at 40 driving shaft 6 through a reduction gear box indicated at 42. Drum 8 rotates counterclockwise as viewed in FIGURE 2.

A pin centering cam 46 is secured to support member 47 on one side of drum 8 and a pin centering cam 48 is secured to support member 47 on the other side of drum 8. As best seen in FIGURE 3, cams 46 and 48 act to center pins 12 with respect to drum 8 and thus place the pins in position to receive an input signal. The input signal is transmitted to pins 12 by a pawl 52 pivotally mounted on a pin 54 secured to support member 47 and having cam portions 56 and 58 (FIGURE 3) lying on opposite sides of drum 8 and adapted to engage the ends 18 and 20 respectively of pins 12 depending on the position of the pawl. Pawl 52 is positioned by a link 62 which is pivotally connected to pawl 52 at 64 and at 66 to a link 68 which is fixedly secured to the output shaft 72 of a torque motor 74 which is responsive to a control signal voltage from a source not shown. Shaft 72 of torque motor 74 is spring biased counterclockwise as viewed in FIGURE 1 by a spring (not shown).

As best seen in FIGURE 5, cable 36 engages and passes around a pulley 82 which is mounted for rotation on a shaft 84 fixedly secured to a bar 86. Cable 38 engages and passes around a pulley 88 which is mounted for rotation on a shaft 92 fixedly secured to a bar 94. As seen in FIGURE 1, a link 96 pivotally mounted on a rod 98 is pivotally connected to a bar 86 by a pin 102 and to bar 94 by a pin 104. Similarly a link 106 is pivotally connected to the other ends of bars 86 and 94 by pins 108 and 110, respectively and is pivotally mounted on a rod 112. An output member 114 is fixedly secured to link 106 by means of pins 108 and 110. Output member 114 as shown is in the form of a pointer which passes above an angle indicator member 116 mounted on posts 107.

Rods 98 and 112 are fixedly secured to a slide 120 provided with grooves 121 engaged by members 122 bolted to base member 123. Slide 120 contains a compression coil spring 124 in a bore 125. Spring 124 is retained by a threaded plug 126 and abuts against support member 47 to bias slide 120 away from the support member 47 and take up any slack in cable 36 or cable 38.

*Operation*

In the operation of the embodiment of the invention shown in FIGURES 1 through 6, motor 40 through reduction gear box 42 drives shaft 6 and drum 8 counterclockwise as viewed in FIGURE 2 at a constant speed. It will be obvious that any other desired driving means such as a spring motor with a governor can be employed in rotating drum 8. As drum 8 rotates the ends 18 and 20 of pins 12 are engaged by and moved past the cams 46 and 48. Each pin 12 thus centered is then engaged by pawl 52 to be set to a position dictated by the signal voltage impressed upon the torque motor 74. As shown in FIGURE 1, no voltage is impressed on torque motor 74 causing shaft 72, links 68 and 62 to position pawl 52 so as to cam all of the pins 12 to the right as viewed in FIGURE 3. This results in cable 38 having a maximum path length about drum 8 and cable 36 having a minimum path length about drum 8 since cable 38 engages the largest diameter of tapered shoulder 14 of each pin while cable 36 engages the minimum diameter of tapered shoulder 16 which can be presented thereto. The output pointer 114 is responsive to these differences in the path lengths of cables 36 and 38 about drum 8. The increased path length for cable 38 causes pulley 88 to be moved closer to drum 8 which in turn through links 96 and 106 causes bar 86 and hence pulley 82 to be moved away from drum 8 which picks up the slack in cable 36 due to the reduced path length of this cable about drum 8. When referring to reduced and increased path lengths it is intended to use as a reference the condition where the pins are centered as shown in FIGURE 4 and the path lengths for cables 36 and 38 about drum 8 are equal. An increase in the signal voltage will cause shaft 72 to rotate clockwise as viewed in FIGURE 1 moving link 68 and link 62 in such a manner as to rotate pawl 52 clockwise as is viewed in FIGURE 1 which in turn reduces the distance cam portion 58 of pawl 52 urges pins 12 towards plate 22 and correspondingly decreases the path length of cable 38 and increases the path length of cable 36 about drum 8 which causes a movement of member 114 counterclockwise as viewed in FIGURE 1. With a 50% voltage input the pawl 52 will be centered so that the already centered pins 12 will not be moved and will remain in the position shown in FIGURE 4 providing an equal path length for the cables and the output member 114 is centered. A further increase in signal voltage will move the pawl 52 further clockwise as viewed in FIGURE 1 until finally with maximum voltage the pins will all be cammed by cam portion 56 up against plate 24 thus providing a maximum path length for cable 36 and a minimum path length for cable 38 with the output member 114 having been moved to the full counterclockwise position as viewed in FIGURE 1. Thus, with the described system the output displacement is infinitely variable and is directly proportional to the signal level.

*Alternative embodiments*

Figure 7:
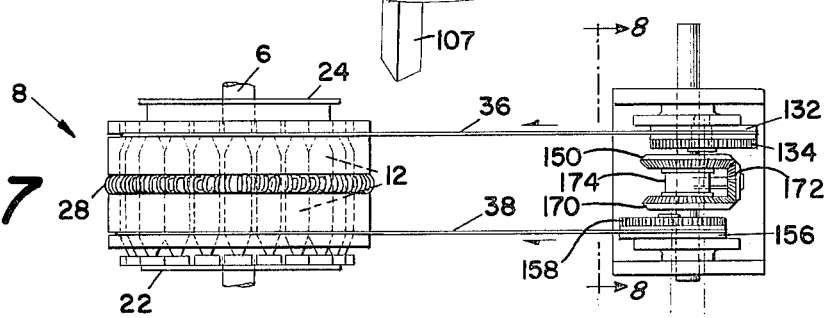
FIGURE 7 is a plan view showing a modified output mechanism for incorporation in the device of FIGURE 1.
Figures 8, 10:
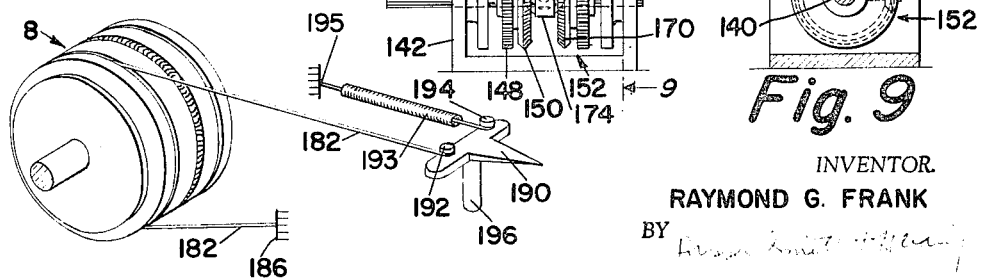
FIGURE 8 is an end view of the output mechanism of FIGURE 7 taken on the plane indicated by the line 8—8 in FIGURE 7.
FIGURE 10 is a side perspective view of a modified path measuring device.
Figure 9:
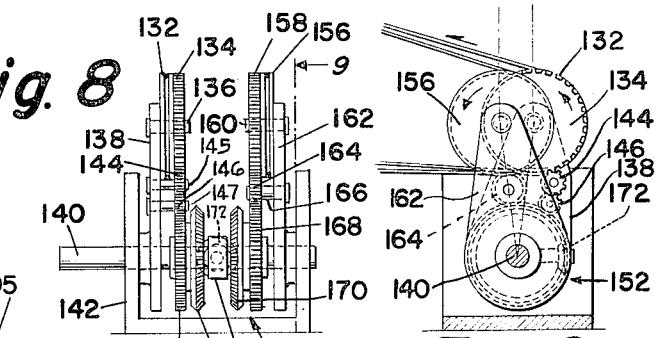
FIGURE 9 is a side elevation of the output of device of FIGURE 7 partially broken away.

It will be evident that a wide variety of different outputs can be achieved by the variations in path lengths traveled by cables 36 and 38 about drum 8. Thus, for example, differences in the rate of travel of cables 36 and 38 due to path length variations can be employed to produce a rotational output as is illustrated by the embodiment of FIGURES 7 through 9. Here the device of FIGURES 1-6 is employed with the exception of the output mechanism engaged by cables 36 and 38. Cable 36 is connected to a grooved pulley 132 which has integral therewith a spur gear 134 and is journalled for free rotation on cantilevered shaft 136 which is fixed to link 138 mounted for free rotation on output shaft 140 which is journalled in frame 142. Gear 134 meshes with a pinion 144 mounted for rotation on cantilevered shaft 145 secured to link 138 and pinion 144 meshes with a pinion 146 mounted for free rotation on cantilevered shaft 147 secured to link 138. Pinion 146 meshes with spur gear 148 which is integral with beveled gear 150 of differential 152, gears 148 and 150 being mounted for free rotation on output shaft 140. Cable 38 is carried by a grooved pulley 156 which has integral therewith a spur gear 158 and is mounted for free rotation on cantilevered shaft 160 secured to a link 162 which is journalled for free rotation on output shaft 140. Gear 158 engages a pinion 164 mounted for free rotation on a cantilevered shaft 166 secured to link 162. Pinion 164 meshes with a spur gear 168 which is integral with differential bevel gear 170, both gears 168 and 170 being journalled for free rotation on output shaft 140. A differential pinion 172 engages bevel gears 150 and 170 and is rotatably secured to spider 174 which in turn is fixedly secured to output shaft 140.

With a control signal which leaves pins 12 centered on drum 8 the path lengths of cables 36 and 38 will be the same causing pulleys 132 and 156 to rotate at the same rotative velocity which in turn will cause gears 144, 146 and 148 to rotate bevel gear 150 in the opposite direction at the same velocity as bevel gear 170 is rotated by the rotation of gears 158, 164 and 168. Since the inputs to the differential 152 are identical, output shaft 140 will not rotate.

Assuming now a signal causing pins 12 to be urged against end plate 22 by pawl 52, the resultant increase in path length of cable 38 about drum 8 (i.e. increase in effective diameter of drum 8) and the corresponding decrease of the path length of cable 36 will cause cable 38 to travel with a greater velocity than cable 36 which in turn will cause the angular velocity of pulley 156 to be greater than that of pulley 132 which in turn results in bevel gear 170 having an angular velocity greater than bevel gear 150 causing bevel gear 170 to rotate counterclockwise (as viewed in FIGURE 9) at a greater rate than beveled gear 150 is rotating clockwise to rotate shaft 140 counterclockwise at maximum velocity. As the pins 12 are positioned back towards their centered position the velocity of output shaft 140 will be decreased and will finally be zero when the pins are centered. It will be evident that when the pins are displaced in the opposite direction the directional rotation of shaft 140 will be clockwise.

As schematically shown in FIGURE 10, in lieu of a pair of endless cables, the path length about drum 8 can be measured by a fixed length cable 182 having its end anchored as indicated at 186 and its other end connected to an output member 190 as indicated at 192. Output member 190 is in the form of a pointer integral with a pivotally mounted rod 196 and is biased counterclockwise as viewed in FIGURE 10 by an extension coil spring 193 secured to member 190 as indicated at 194 and to a fixed member as indicated at 195.

It will also be obvious that the electrical means for controlling the mechanical input can be varied widely. Referring to FIGURE 11, the servomechanism of FIGURES 1 through 6 is modified to the extent that the position of pawl 52 is controlled by link 202 which is pivotally connected to pawl 52 at 204 and is pivotally connected at 206 to the plunger 208 of a solenoid 210. When solenoid 210 is energized it pivots pawl 52 clockwise as viewed in FIGURE 11 to a position where it will cause pins 12 to be moved outwardly against end plate 24. A coil spring 212 which is secured at one end to pawl 52 and at the other end to a fixed support 214 moves pawl 52 counterclockwise as viewed in FIGURE 11 when solenoid 210 is deenergized to cause pawl 52 to urge the pins 12 outwardly against side plate 22.

Advantageously solenoid 210 will be responsive to very short pulses to provide for maximum flexibility of control. Solenoid 210 is connected by a line 216 to a battery indicated at 218 which is connected to ground by a line indicated at 220. The circuit from solenoid 210 is completed by a line 222 to a transistor 224 of the type 2N1724 and thence to ground through line 226. A control signal voltage can be impressed on terminals 228 and 230 to make transistor 224 conductive and thus energize solenoid 210.

The great flexibility of operation possible from this simple servomechanism and control system is indicated by FIGURES 18 through 27. Even numbered FIGURES 18 through 26 each show a schematic development of a drum 8 and path length determining pins 12. The pins are shown only on the side on which they are providing the greater path length i.e. to which they are presenting the greater diameter. Odd numbered FIGURES 19 through 27 show the corresponding control signals used to produce the pin dispositions of the opposite even-numbered FIGURES 18 through 26, respectively. One cycle of signals is represented in each of odd numbered FIGURES 19 through 27 which in time corresponds to 180° of rotation of the drum 8 in even-numbered FIGURES 18 through 26.

Referring now to FIGURES 18 and 19 with 100% pulse width modulation as represented by line 242 in FIGURE 19, solenoid 210 will be continuously energized causing pins 12 to provide the maximum path length for cable 36 and the minimum path length for cable 38 causing pointer 114 to be in the maximum counterclockwise position as viewed in FIGURE 11. With no signal as illustrated by line 250 in FIGURE 27, solenoid 210 will be continuously deenergized with pins 12 being urged by pawl 52 against side plate 22 to cause pointer 114 to assume the extreme opposite, i.e. clockwise position as shown in FIGURE 11. With a constant control signal of 50% pulse width modulation as illustrated by line 246 in FIGURE 23 being impressed on terminals 228 and 230 the pattern of pins presented to cables 36 and 38 is illustrated in FIGURE 22 in which in 360° of rotation equal numbers of pins 12 will be extended against end plates 22 and 24 which will result in an equal path length for cables 36 and 38 with the positioning of the pointer in a central position. The signals illustrated by lines 244 and 248 of FIGURES 21 and 25 and the corresponding pin conditions shown in FIGURES 20 and 24 illustrate intermediate positioning of pointer 114.

FIGURES 28 through 30 will further facilitate a clearer understanding of the operation immediately discussed above. FIGURES 28 through 30 schematically illustrate the operation of the servomechanism of FIGURE 11 with the signal illustrated in FIGURE 23. With pins 12 being cammed to alternate sides in groups of five, it will be seen that a substantially equal path length will be provided for cables 36 and 38. While obviously some minor variations in path length will occur, they are immaterial from a practical point of view in that they occur at a very rapid rate due to the high speed of rotation of drum 8, for example 450 r.p.m. at which speed a 15 c.p.s. signal could be employed by way of illustration. Where one cycle of the signal does not occur during one or more complete rotations of the drum, it is desirable to have an even number of pins. When one cycle of the signal corresponds to an even fraction such as ½ or ¼ of a rotation of the drum, an even number of pins is desirable and an odd number is desirable when it corresponds to an odd fraction such as ⅓ of a rotation of the drum.

FIGURES 31 through 33 illustrate the operation of the device of FIGURE 11 using a signal like that of FIGURE 19. Here it will be seen that in contrast to the equal path lengths of FIGURES 28 to 30 the path lengths about drum 8 for cable 36 is increased while that for cable 38 is decreased causing pulley 82 to be moved towards drum 8 and pulley 88 to be moved away from drum 8.

In view of the on-off type of operation provided by solenoid 210 with only the two extreme positions possible for pawl 52, it will be evident that pins 12 need not employ tapered shoulders 14 and 16 but need only have two different diameters for the reception of each cable. Referring to FIGURE 12, pins 252 are slidably mounted in opening 10 and drum 8 in lieu of pins 12. Pins 252 have a large diameter portion 254 for the engagement of cable 36 or 38 to provide an increased path length and reduced diameter portions 256 and 258 providing for reduced path length for cables 38 and 36, respectively.

Similarly, it will be obvious that a wide variety of other members other than pins can be employed to provide varied path lengths. Referring to FIGURES 13 and 14 a modified drum 259 mounted on shaft 6 in lieu of drum 8 has a peripheral groove 260 carrying a garter spring 262 which engages a kidney shaped slot 264 in a stepped member 266 which has steps 268, 270 and 272. Each member 266 is carried in a transverse slot 274 in drum 258 and can be cammed by pawl 52 into either the position shown in FIGURE 13 or the position shown in FIGURE 14. In the former position the path length of cable 36 will be relatively long while the path length of cable 38 will be relatively short while in the latter position, the reverse will be true.

An alternative arrangement is shown in FIGURES 15 through 17. A drum 280 is mounted on shaft 6 in lieu of drum 8 and provided with slots 282 in each of which is mounted a slide 284 having sloping top surfaces 286 and 288 which respectively engage cables 36 and 38 which in turn are carried respectively in slots 290 and 292. Here again, slide 284 can be cammed by pawl 52 either into the position shown in FIGURE 16 or the position shown in FIGURE 17. In the former position, the path of cable 36 is relatively long and that of cable 38 relatively short while in the latter position, the reverse is true.

It will be understood that the above described embodiments are illustrative only of the invention and are not intended to be limiting.

What is claimed is:

1. A servo mechanism comprising a drum, motor means to rotate the drum, output means spaced from the drum and having a pair of spaced portions movable in opposite directions to inversely vary their distances from the drum, a pair of spaced cables passing around at least a part of the drum with each cable engaging one of said portions of the output means, means mounted on the drum to vary inversely the path lengths of the cables around the drum to vary inversely the distances of the spaced portions of the output means from the drum to provide a resultant output from the output means.

2. A mechanism in accordance with claim 1 in which the means to vary the path lengths comprises spaced members movably mounted on the drum with each member adapted to support the cables at varying distances from the axis of the drum and means to move each member to vary the path lengths of the cables about the drum.

3. A mechanism in accordance with claim 1 in which the means to vary the path lengths comprises spaced members mounted for movement parallel to the axis of the drum and having cable supporting surfaces at varying distances from the axis of the drum, and means to move each member to vary the path lengths of the cables about the drum.

4. A mechanism in accordance with claim 3 in which the cable supporting surfaces of each spaced member decrease in distance from the axis of the drum from the inner portions thereof to the outer portions thereof.

5. A mechanism in accordance with claim 1 in which the cables are endless and each portion of the output means includes a pulley.

6. A mechanism in accordance with claim 5 in which the output means includes a differential and the pulleys are connected to the differential to provide inputs thereto.

7. A mechanism in accordance with claim 1 in which the means to vary the path lengths of the cables around the drum includes spaced pins mounted for movement parallel to the axis of the drum and each having cable supporting surfaces the inner portions of which are at a different distance from the axis of the drum than the outer portions, means to center each pin at a predetermined point during each rotation of the drum and means to vary the position of each pin from the centered position.

8. A mechanism in accordance with claim 7 in which the means to vary the position of the pins includes a solenoid.

9. A mechanism in accordance with claim 7 in which the means to vary the position of the pins includes a torque motor.

10. A servo mechanism comprising a drum, motor means to rotate the drum, output means spaced from the drum and having a member movable to vary the distance of the member from the drum, a cable passing around at least a portion of the drum and engaging the movable member, means to bias the member away from the drum and means mounted on the drum to vary the path length of the cable around the drum to vary the distance of the movable member from the drum and thereby provide a resultant output from the output means.

11. A mechanism in accordance with claim 10 in which the means to vary the path length comprises spaced members movably mounted on the drum with each member adapted to support the cable at varying distances from the axis of the drum and means to move each member to vary the path length of the cable about the drum.

12. A mechanism in accordance with claim 10 in which the means to vary the path length comprises pins mounted for movement parallel to the axis of the drum and having cable supporting surfaces at varying distances from the axis of the drum, and means to move each pin to vary the path length of the cable about the drum.

13. A mechanism in accordance with claim 12 in which the means to vary the position of the pins includes a solenoid.

14. A mechanism in accordance with claim 12 in which the means to vary the position of the pins includes a torque motor.

References Cited by the Examiner

UNITED STATES PATENTS

| | | | |
|---|---|---|---|
| 2,742,793 | 4/1956 | Askren et al. | 74—230.16 X |
| 2,831,358 | 4/1958 | Michie | 74—230.17 |

MILTON KAUFMAN, *Primary Examiner.*